(12) United States Patent
Lin

(10) Patent No.: US 12,078,839 B1
(45) Date of Patent: Sep. 3, 2024

(54) OPTICAL MODULE AND ELECTRONIC DEVICE

(71) Applicant: LITE-ON TECHNOLOGY CORPORATION, Taipei (TW)

(72) Inventor: Yu-Kuan Lin, New Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 18/413,143

(22) Filed: Jan. 16, 2024

Related U.S. Application Data

(60) Provisional application No. 63/459,378, filed on Apr. 14, 2023, provisional application No. 63/452,441, filed on Mar. 16, 2023.

(30) Foreign Application Priority Data

Aug. 10, 2023 (CN) .......................... 202322144553.1

(51) Int. Cl.
*G02B 6/00* (2006.01)
*F21V 8/00* (2006.01)

(52) U.S. Cl.
CPC ......... *G02B 6/0056* (2013.01); *G02B 6/0076* (2013.01)

(58) Field of Classification Search
CPC .................................................. G02B 6/0056
USPC ....................................................... 362/609
See application file for complete search history.

(56) References Cited

U.S. PATENT DOCUMENTS

| 2010/0073599 | A1* | 3/2010 | Yoon ..................... G02B 5/3058 349/64 |
| 2011/0149201 | A1* | 6/2011 | Powell .............. G02F 1/133615 349/62 |
| 2017/0045673 | A1* | 2/2017 | Lee ....................... G02B 6/0056 |
| 2021/0294021 | A1* | 9/2021 | Romero ............ G02F 1/133524 |

FOREIGN PATENT DOCUMENTS

| CN | 204141394 U | 2/2015 |
| CN | 111077695 A | 4/2020 |
| CN | 215336113 U | 12/2021 |
| TW | M635383 U | 12/2022 |

* cited by examiner

*Primary Examiner* — Christopher M Raabe
(74) *Attorney, Agent, or Firm* — Li & Cai Intellectual Property (USA) Office

(57) ABSTRACT

An optical module and an electronic device are provided. The optical module includes a substrate, a first light guide plate, a first light-emitting element, a reflective layer, a first pattern layer, a first light-shielding structure, and a beam splitting layer. The first light guide plate has first and second surfaces opposite to each other. The second surface faces the substrate. The first light-emitting element has a light output surface facing a side portion of the first light guide plate. The reflective layer is arranged between the substrate and the first light guide plate. The first pattern layer is formed on the first light guide plate. The first light-shielding structure covers a part of the substrate, and the first surface of the first light guide plate. The beam splitting layer is disposed above the first light guide plate and the first light-shielding structure.

27 Claims, 12 Drawing Sheets

OPTICAL MODULE AND ELECTRONIC DEVICE

CROSS-REFERENCE TO RELATED PATENT APPLICATION

This application claims the benefit of priority to China Patent Application No. 202322144553.1, filed on Aug. 10, 2023, in the People's Republic of China. The entire content of the above identified application is incorporated herein by reference.

This application claims the benefits of priorities to the U.S. Provisional Patent Application Ser. No. 63/452,441, filed on Mar. 16, 2023, and Ser. No. 63/459,378, filed on Apr. 14, 2023, which applications are incorporated herein by reference in their entireties.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical module and an electronic device, and more particularly to an optical module and an electronic device having an infinite reflection mirror effect.

BACKGROUND OF THE DISCLOSURE

An existing infinite reflection mirror is designed to be used in interior decoration or art installation, and a main principle of the infinite reflection mirror is to configure an LED to be between two parallel mirrors. Therefore, when the LED emits light, the light is exposed to the pair of mirrors spaced apart, a number of reflections will appear in the mirror space to present a stereoscopic superimposition, such that an infinite mirror image effect and an infinite spatial extension effect are present in the infinite reflection mirror.

However, for existing infinite reflection mirrors that are only used in interior decoration or art installation, the infinite reflection mirrors generally utilize the infinite extension of a light source point to produce an aesthetic design of multiple mirror images. In this way, the effectiveness and utilization of the aforementioned infinite reflection mirror is limited to the infinite extension and visual extension of the general "light source point," and only a monotonous pattern effect is presented by the infinite reflection mirror. Furthermore, the bodies and the location of the light-emitting elements are easily revealed in the infinite reflection mirror and therefore are less appealing in appearance.

SUMMARY OF THE DISCLOSURE

In response to the above-referenced technical inadequacies of the body and the location of the light-emitting element being easily revealed in the existing technology and the pattern of the infinite reflection mirror being monotonous and limited, the present disclosure provides an optical module to enrich and improve on a visual effect of the infinite reflection mirror.

In order to solve the above-mentioned problems, one of the technical aspects adopted by the present disclosure is to provide an optical module. The optical module includes a substrate, a first light guide plate, at least one first light-emitting element, a reflective layer, a first pattern layer, and a beam splitting layer. The first light guide plate is disposed above the substrate. The first light guide plate has a first surface and a second surface that is opposite to the first surface, and the second surface faces the substrate. Two lateral sides of the first light guide plate that extend oppositely along a first direction are defined as a first side portion and a second side portion that is opposite to the first side portion. The at least one first light-emitting element is disposed on the substrate, a light output surface of the at least one first light-emitting element faces the first side portion. The reflective layer is arranged between the substrate and the first light guide plate. The first pattern layer is formed on the first light guide plate. The beam splitting layer is disposed above the first light guide plate and disposed away from the substrate. A predetermined gap is defined between side edge of the reflective layer adjacent to the light output surface and the first side portion.

In order to solve the above-mentioned problems, another one of the technical aspects adopted by the present disclosure is to provide an optical module. The optical module includes a substrate, a first light guide plate, at least one first light-emitting element, a reflective layer, a first pattern layer, a first light-shielding structure, and a beam splitting layer. The first light guide plate is disposed above the substrate. The first light guide plate has a first surface and a second surface that is opposite to the first surface, and the second surface faces the substrate. Two lateral sides of the first light guide plate that extend along a first direction are respectively defined as a first side portion and a second side portion that is opposite to the first side portion. The at least one first light-emitting element is disposed on the substrate. The at least one first light-emitting element has a light output surface facing the first side portion. The reflective layer is arranged between the substrate and the first light guide plate. The first pattern layer is formed on the first light guide plate. The first light-shielding structure covers a part of the substrate and a part of the first surface of the first light guide plate that is configured to hide the at least one first light-emitting element. The beam splitting layer is disposed above the first light guide plate and the first light-shielding structure, and disposed away from the substrate.

In one of the possible or preferred embodiments, the at least one first light-emitting element is plural in quantity, the plurality of first light-emitting elements are arranged to be spaced apart from each other along the first direction that is parallel to the first side portion, and two adjacent ones of the plurality of first light-emitting elements have one of a plurality of gap regions formed therebetween.

In one of the possible or preferred embodiments, a side edge of the reflective layer adjacent to the light output surface is substantially parallel to the first side portion.

In one of the possible or preferred embodiments, a predetermined gap is defined between the side edge of the reflective layer and the first side portion, and the predetermined gap ranges from 4 mm to 6 mm.

In one of the possible or preferred embodiments, the first light-shielding structure includes a first upper extension, a first lower extension, and a first connection portion connected to each of the first upper and lower extensions, the first lower extension is located below the bottom surface of the substrate, the first connection portion is located beside a lateral side of the substrate and the at least one first light-emitting element, and the first upper extension covers a part of the first surface of the first light guide plate.

In one of the possible or preferred embodiments, areas of orthogonal projections of the first upper extension and the first lower extension on the substrate do not overlap with an area of an orthogonal projection of the reflective layer on the substrate.

In one of the possible or preferred embodiments, the optical module further includes an anti-reflective coating layer formed on the first light guide or the substrate. The anti-reflective coating layer is disposed between the first light guide and the substrate, and an area of an orthogonal projection of the anti-reflective coating layer on the substrate overlaps with an area defined between the reflective layer and the first side portion of the first light guide plate.

In one of the possible or preferred embodiments, the anti-reflective coating layer has a plurality of extension regions, and the plurality of extension regions respectively correspond to the plurality of gap regions.

In one of the possible or preferred embodiments, in a second direction orthogonal to the first direction, a perpendicular distance D between an edge of the first pattern layer adjacent to the at least one first light-emitting element and the first side portion, and a distance P between center axes of two adjacent ones of the first light-emitting elements satisfy a relation of: D/P being between 0.3 and 0.7.

In one of the possible or preferred embodiments, an area of an orthogonal projection of the reflective layer on the substrate covers an area of an orthogonal projection of the first pattern layer on the substrate.

In one of the possible or preferred embodiments, the first pattern layer is a white pattern layer composed of white ink.

In one of the possible or preferred embodiments, the first side portion of the first light guide plate has at least one optical microstructure corresponding to the at least one first light-emitting element.

In one of the possible or preferred embodiments, the first pattern layer is disposed on at least one of the first surface and the second surface of the first light guide plate.

In one of the possible or preferred embodiments, the optical module further includes a light-blocking layer for bonding the first light guide plate to the reflective layer. The light-blocking layer is disposed on and surrounds a peripheral region of at least one of the reflective layer and the first light guide plate.

In one of the possible or preferred embodiments, the optical module further includes a second light guide plate, at least one second light-emitting element, a second pattern layer, a second light-shielding structure, and a third light-shielding structure. The second light guide plate is arranged between the first light guide plate and the substrate. The second light guide plate has a third surface and a fourth surface that is opposite to the third surface, and the fourth surface faces the substrate. Two lateral sides of the second light guide plate that extend along the first direction are respectively defined as a third side portion and a fourth side portion that is opposite to the third side portion. The third side portion is substantially flush with the first side portion, and the fourth side portion is substantially flush with the second side portion. The at least one second light-emitting element is disposed on the substrate. A light output surface of the at least one second light-emitting element faces the fourth side portion. The second pattern layer is formed on the second light guide plate. The second light-shielding structure covers at least a part of the third surface, the third side portion, and a part of the fourth surface of the second light guide plate. The third light-shielding structure covers at least a part of the first surface, the second side portion, and a part of the second surface of the first light guide plate.

In one of the possible or preferred embodiments, the optical module further includes a second light guide plate, at least one second light-emitting element, a second pattern layer, a second light-shielding structure, and a third light-shielding structure. The second light guide plate is arranged between the first light guide plate and the substrate. The second light guide plate has a third surface and a fourth surface that is opposite to the third surface, and the fourth surface faces the substrate. Two lateral sides of the second light guide plate extending along the first direction and a second direction are respectively defined as a third side portion and a fourth side portion that is adjacent to the third side portion. The third side portion is substantially flush with the first side portion. The at least one second light-emitting element is disposed on the substrate. A light output surface of the at least one second light-emitting element faces the fourth side portion. The second pattern layer is formed on the second light guide plate. The second light-shielding structure covers at least a part of the third surface, a fifth side portion that is opposite to the fourth side portion, and a part of the fourth surface of the second light guide plate. The third light-shielding structure covering at least a part of the first surface, the second side portion, and a part of the second surface of the first light guide plate.

In one of the possible or preferred embodiments, the first pattern layer is a gray pattern layer or a white pattern layer, and the second pattern layer is a white pattern layer.

In one of the possible or preferred embodiments, the at least one second light-emitting element is plural in quantity, the plurality of second light-emitting elements are arranged to be spaced apart from each other along a direction that is parallel to the fourth side portion, and the plurality of second light-emitting elements and the at least one first light-emitting element have a same wavelength range or different wavelength ranges.

In order to solve the above-mentioned problems, another one of the technical aspects adopted by the present disclosure is to provide an electronic device. The electronic device includes a housing and the aforementioned optical module. The optical module is disposed in the housing.

Therefore, in the optical module provided by the present disclosure, by virtue of "a predetermined gap being defined between a side edge of the reflective layer adjacent to the light output surface and the first side portion," a pattern can be completely illuminated and the brightness can be consistent, such that the pattern is highly uniform and appealing in appearance.

Furthermore, in the optical module provided by the present disclosure, by virtue of "the first light-shielding structure covering a part of the substrate and a part of the first surface of the first light guide plate that is configured to hide the at least one first light-emitting element" "a side edge of the reflective layer adjacent to the light output surface being substantially parallel to the first side portion, and a predetermined gap being defined between the side edge of the reflective layer and the first side portion," "an area of an orthogonal projection of the reflective layer on the substrate covering an area of an orthogonal projection of the first pattern layer on the substrate," and "the optical module further including an anti-reflective coating layer formed on the first light guide or the substrate, and an area of an orthogonal projection of the anti-reflective coating layer on the substrate overlapping with an area defined between the reflective layer and the first side portion of the first light guide plate," when the material of the reflective layer reflects the light emitted by the first light-emitting element, an issue of a bright spot of the first light-emitting element being enhanced and causing uneven brightness can be prevented, thereby achieving the technical effects of the first pattern layer being completely illuminated and the first pattern layer having a consistent brightness. In addition, when the aforementioned predetermined gap ranges from 4 mm to 6 mm, the aforementioned technical effect can be further improved.

Moreover, in the optical module provided by the present disclosure, by virtue of "a perpendicular distance D between an edge of the first pattern layer adjacent to the at least one first light-emitting element and the first side portion, and a distance P between center axes of two adjacent ones of the first light-emitting elements satisfying a relation of: D/P being between 0.3 and 0.7," the first pattern layer can be fully presented, and a light consistency of the optical module can be improved.

In addition, in the optical module provided by the present disclosure, by virtue of "the first side portion of the first light guide plate having at least one optical microstructure corresponding to the at least one first light-emitting element," through the optical microstructure, a light output angle of the first light-emitting element can be increased, such that the distance P between the center axes of two adjacent ones of the first light-emitting elements can also be increased. Therefore, an amount of the first light-emitting elements can be reduced, thereby decreasing a manufacturing cost of the optical module.

In addition, in the optical module provided by the present disclosure, by virtue of "the optical module further including a light-blocking layer for bonding the first light guide plate to the reflective layer, and the light-blocking layer being disposed on and surrounding a peripheral region of at least one of the reflective layer and the first light guide plate," and "the light-blocking layer adopting a black double-sided tape," the adhesive layer can be prevented from receiving/absorbing light and radiating the light to the outside that negatively affects a desired light-emitting effect of the optical module.

According to certain embodiments of the present disclosure, the optical module includes a first pattern module and a second pattern module. By the design of the first light-shielding structure, the second light-shielding structure, and the third light-shielding structure, and the technical solution of "the first light-emitting element and the second light-emitting element emitting light simultaneously, or only one of the first light-emitting element and the second light-emitting element emitting light at a time," a visual effect having a rich pattern can be provided to users.

The present disclosure further provides an electronic device that includes the aforementioned optical module, and the technical effects of the aforementioned optical module can be achieved during practical usage of the electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
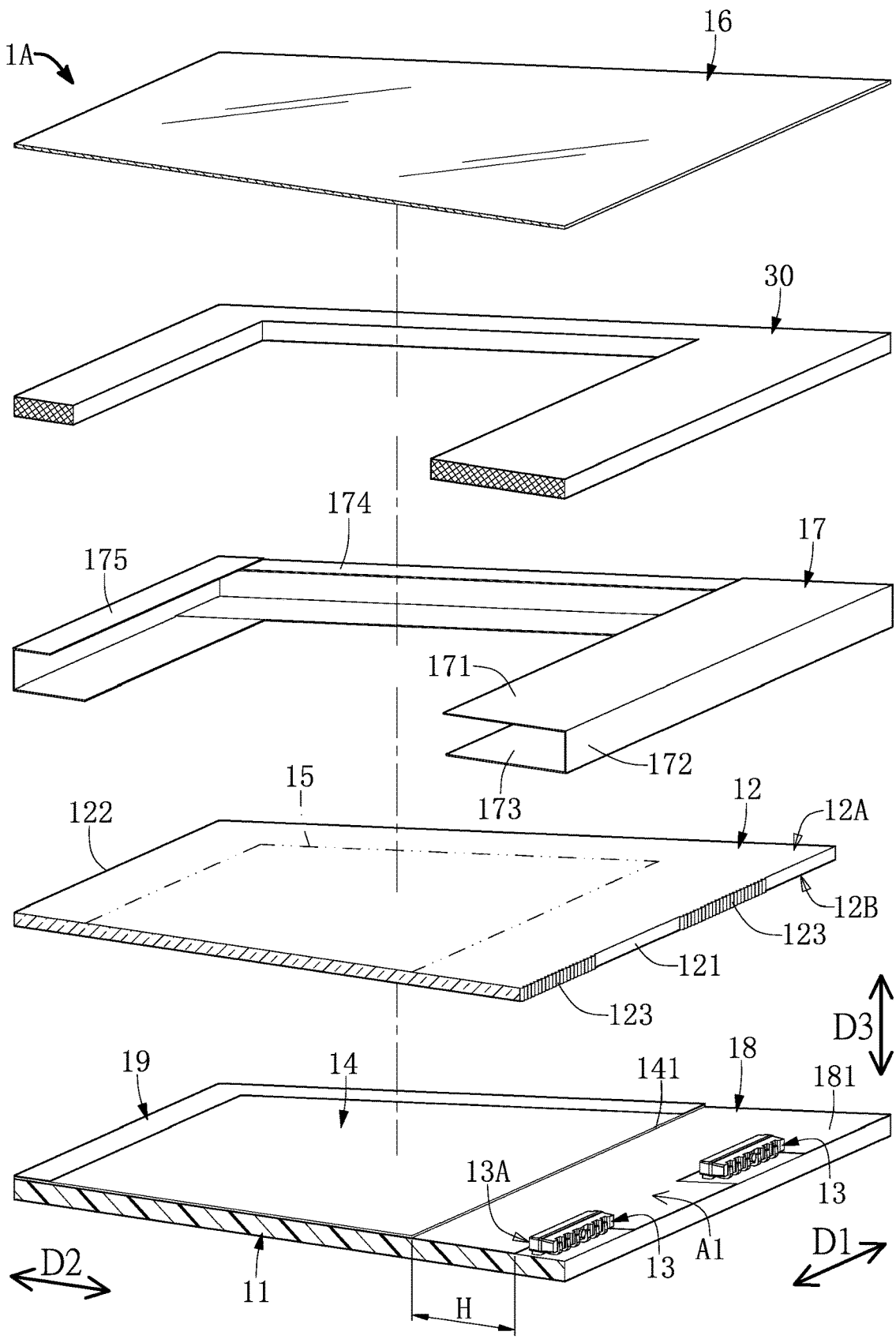
FIG. 1 is a schematic partially exploded view of an optical module according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

EMBODIMENTS

Figure 2:
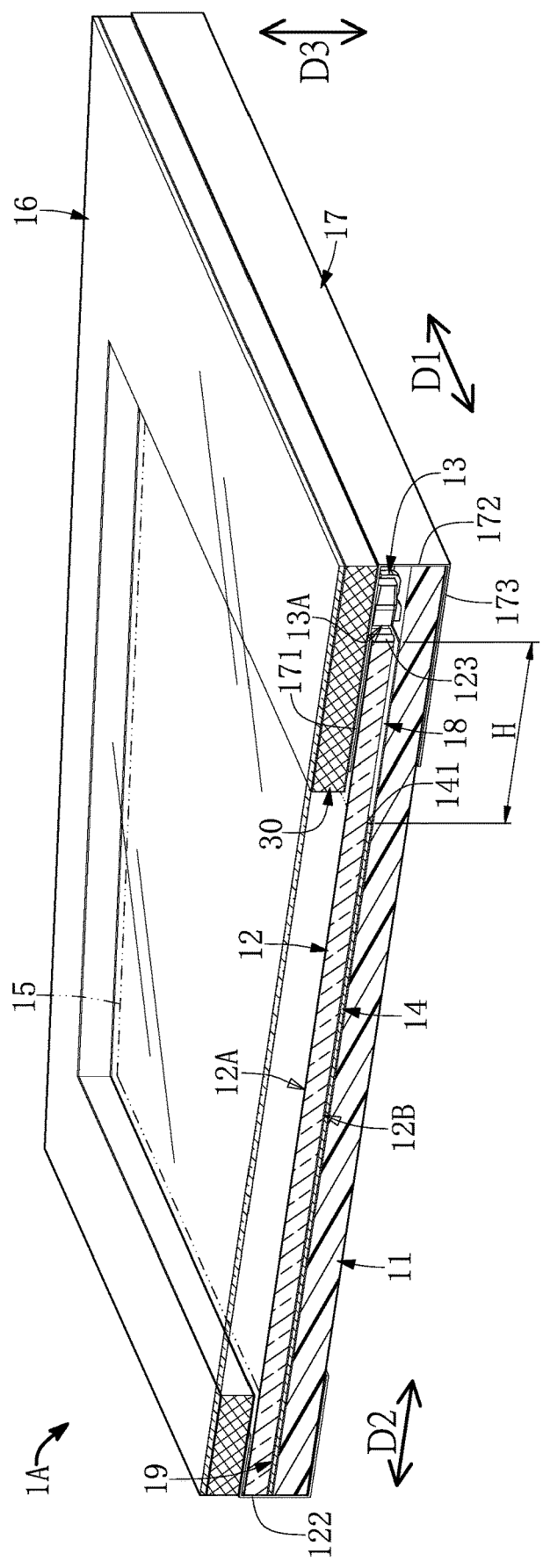
FIG. 2 is an assembly view of the embodiment of FIG. 1.
Figure 3:
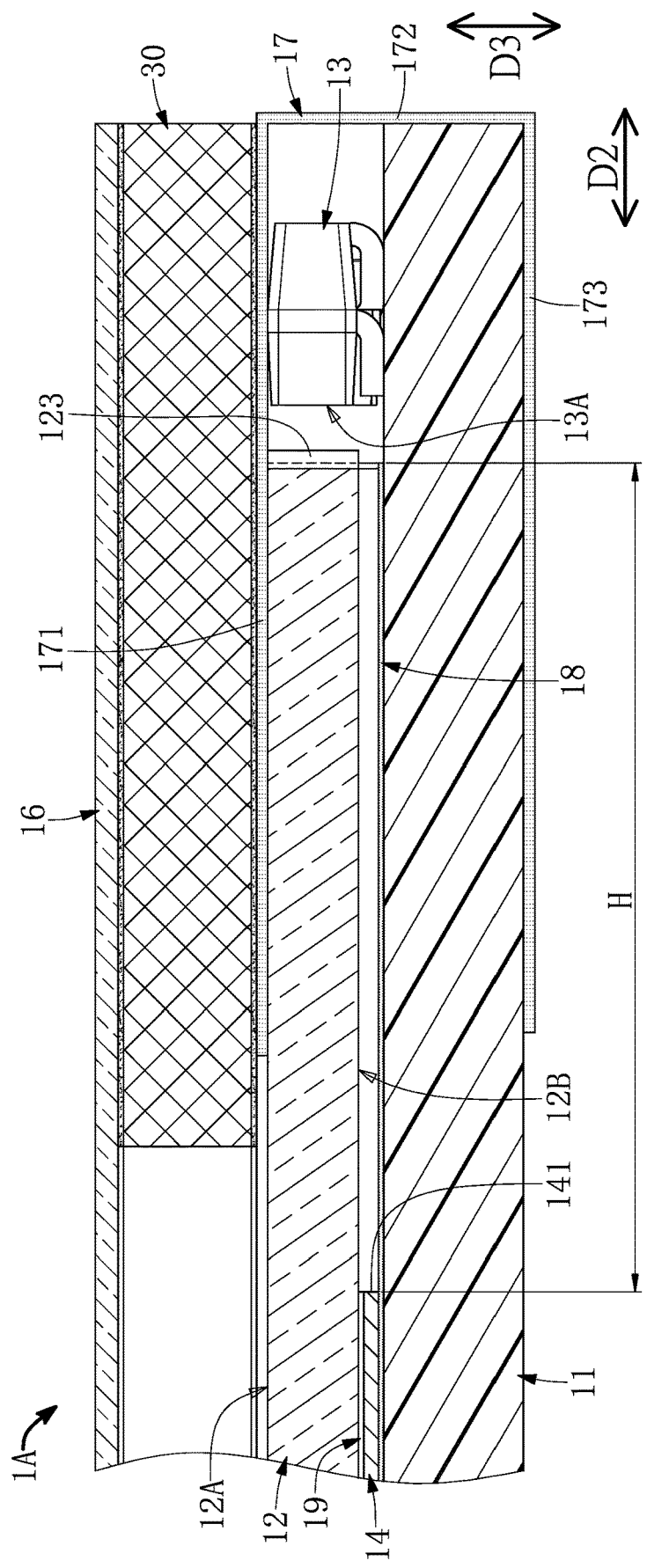
FIG. 3 is a cross-sectional view of the embodiment of FIG. 2.

Referring to FIG. 1 to FIG. 3, FIG. 1 is a schematic partially exploded view of an optical module according to one embodiment of the present disclosure, FIG. 2 is an assembly view of the embodiment of FIG. 1, and FIG. 3 is a cross-sectional view of the embodiment of FIG. 2. An optical module 1A includes a substrate 11, a first light guide plate 12, at least one first light-emitting element 13, a reflective layer 14, a first pattern layer, and a beam splitting layer 16. The first light guide plate 12 is disposed above the substrate 11. The first light guide plate 12 has a first surface 12A and a second surface 12B that is opposite to the first surface 12A, and the second surface 12B faces the substrate 11. Two lateral sides of the first light guide plate 12 that extend oppositely along a first direction D1 are defined as a first side portion 121 and a second side portion 122 that is opposite to the first side portion 121. The at least one first light-emitting element 13 is disposed above the substrate 11, and a light output surface 13A of the at least one first light-emitting element 13 faces the first side portion 121 (as the light input side). The reflective layer 14 is arranged between the substrate 11 and the first light guide plate 12. The first pattern layer is formed on the first light guide plate 12. The beam splitting layer 16 is disposed above the first light guide plate 12 and disposed away from the substrate 11. A predetermined gap is defined between a side edge 141 of the reflective layer 14 adjacent to the light output surface 13A and the first side portion 121. Specifically, the side edge 141 of the reflective layer 14 adjacent to the light output surface 13A is substantially parallel to the first side portion 121 along the first direction D1, and a predetermined gap H is defined between the side edge 141 and the first side portion 121.

According to certain embodiments, the aforementioned predetermined gap H can be from 4 mm to 6 mm. In this way, an issue of a bright spot of the first light-emitting element 13 being enhanced and causing uneven brightness resulting from a size of the reflective layer 14 being equal to a size of the first light guide plate 12 and the material of the reflective layer 14 reflecting light emitted by the first light-emitting element 13 can be prevented.

The aforementioned substrate 11 can be a printed circuit board (PCB), and the first light-emitting element 13 can be a light-emitting diode (LED), but the present disclosure is not limited thereto. A quantity of the light-emitting element 13 can be one or more. According to the embodiment as shown in FIG. 1, the light-emitting elements 13 are plural in quantity. The plurality of light-emitting elements 13 are arranged to be spaced apart from each other along the first direction D1 that is parallel to the first side portion 121, and two adjacent ones of the plurality of first light-emitting elements 13 form a gap region A1 therebetween. The first light guide plate 12 can be made of polymethyl methacrylate (PMMA) so as to have high light-permeability. According to certain embodiments, the first light guide plate 12 can be made of cyclo-olefin polymer (COP) or polycarbonate (PC), but the present disclosure is not limited thereto. In addition, according to certain embodiments, the reflective layer 14 has good light reflectivity, such as 95%, and the reflective layer 14 can be such as a thin plate made of silver. The first pattern layer can be formed on at least one of the first surface 12A and the second surface 12B of the first light guide plate 12. For example, the first pattern layer can be formed on a patterned region of the first light guide plate 12. The patterned region is referred to as a first pattern layer 15 in the following descriptions of the present disclosure. The first pattern layer 15 can be spray-coated on at least one of the first surface 12A and the second surface 12B by a spray-painting manner. However, the present disclosure is not limited thereto. According to certain embodiments, the first pattern layer 15 is formed on at least one of the first surface 12A and the second surface 12B by a way of printing.

According to certain embodiments, the first pattern layer 15 is a white pattern layer that does not have a color mixing effect when the light emitted by the first light-emitting element 13 illuminates the first pattern layer 15. Furthermore, the white pattern layer is composed of a white ink which is capable of reflecting light.

In the embodiment as shown in FIG. 1, the optical module 1A further includes a supporting member 30 located between the beam splitting layer 16 and the first light guide plate 12. The supporting member 30 is capable of supporting the beam splitting layer 16 and separating the beam splitting layer 16 from the first light guide plate 12. The supporting member 30 can be made of an elastic material, but it is not limited thereto. For example, the supporting member 30 can be a sponge frame. The beam splitting layer 16 can be a film layer that is partially light-permeable. According to certain embodiments, the beam splitting layer 16 has a characteristic of allowing a part of a light beam to pass therethrough and reflecting another part of the light beam, and a light reflectance of the beam splitting layer 16 can be greater than a light permeability of the beam splitting layer 16. In certain embodiments, the light reflectance of the beam splitting layer 16 ranges from 70% to 95%, and the light permeability of the beam splitting layer 16 ranges from 5% to 30%.

In the embodiment as shown in FIG. 1, the optical module 1A further includes a first light-shielding structure 17. In this embodiment, the first light-shielding structure 17 is a frame structure that covers a part of the substrate 11 and a part of the first surface 12A of the first light guide plate 12 so as to not expose the at least one first light-emitting element 13 to the outside. More specifically, the first light-shielding structure 17 can surround the four lateral sides of the substrate 11 and the first light guide plate 12, but it is not limited thereto. It should be noted that, in one embodiment, the first light-shielding structure 17 can be only located at a side of the at least one first light-emitting element 13 arranged along the first direction D1. In another embodiment, two opposing first light-shielding structures 17 are respectively located at the lateral sides of the first light guide plate 12 that are opposite to each other and extend along the first direction D1. Furthermore, in this embodiment, the first light-shielding structure 17 includes a first upper extension 171 (e.g., a lateral light-shielding portion 174, a light-shielding extension 175), a first lower extension 173, and a first connection portion 172 connected to each of the first upper extension 171 and the first lower extension 173. The first lower extension 173 is located below the bottom surface of the substrate 11, the first connection portion 172 is located beside a lateral side of the substrate 11 and the at least one first light-emitting element 13 (as shown in FIG. 2 and FIG. 3), and the first upper extension 171 covers a part of the at least one first light-emitting element 13 and a part of the first surface 12A of the first light guide plate 12. In this embodiment, orthogonal projections of the first upper extension 171 and the first lower extension 173 on the substrate 11 do not overlap or partially overlap with an orthogonal projection of the reflective layer 14 on the substrate 11. According to one embodiment, the first light-shielding structure 17 can be a symmetric frame formed by the first upper extension 171 (including the lateral light-shielding portion 174 and the light-shielding extension 175 that is located opposite to and is symmetrical with the first upper extension 171), the first lower extension 173, and the first connection portion 172 that continuously extend and surround four lateral sides of the substrate 11 and the first light guide plate 12. The first light-shielding structure 17 can be, but is not limited to, a tape that is capable of shielding light. The first light-shielding structure 17 can shield the light emitted from the first light-emitting elements 13 from leaking outward.

The beam splitting layer 16 is arranged above the first light guide plate 12 and the first light-shielding structure 17, and is disposed away from the substrate 11. According to certain embodiments, the predetermined gap H is defined between the side edge 141 of the reflective layer 14 and the first side portion 121 of the first light guide plate 12, and an area of an orthogonal projection of the reflective layer 14 on the first light guide plate 12 covers a region of the first pattern layer 15. In other words, the first pattern layer 15 is within a region of the orthogonal projection of the reflective layer 14 on the first light guide plate 12, such that an issue of the first light-emitting element 13 producing an apparent bright spot is reduced.

As shown in FIG. 1, in other words, the lateral light-shielding portion 174 is located on a lateral extension of the first light guide plate 12 in a second direction D2, and shields the lateral extension and a part of the first surface 12A. The light-shielding extension 175 is connected to one end of the lateral light-shielding portion 174 (as shown in FIG. 1, a part of the light-shielding extension 175 overlaps with a part of the lateral light-shielding portion 174) so as to be located on the second side portion 122. The light-shielding extension 175 shields the second side portion 122 and a part of the first surface 12A, but it is not limited thereto.

In the embodiment as shown in FIG. 1, the optical module 1A further includes an anti-reflective coating layer 18 formed on the first light guide plate 12 or the substrate 11. The anti-reflective coating layer 18 is disposed between the first light guide plate 12 and the substrate 11, and an area of an orthogonal projection of the anti-reflective coating layer 18 on the substrate 11 overlaps with an area defined between the reflective layer 14 and the first side portion 121. Specifically, the orthogonal projection of the anti-reflective coating layer 18 along a third direction D3 (e.g., a vertical direction) on the first light guide plate 12 shields the area between the reflective layer 14 and the first side portion 121. In other words, the predetermined gap H is defined between the side edge 141 of the reflective layer 14 and the first side portion 121, and the orthogonal projection of the anti-reflective coating layer 18 along the third direction D3 on the first light guide plate 12 shields the area defined by the predetermined gap H. The anti-reflective coating layer 18 can be disposed on a surface (e.g., the first surface 12A or the second surface 12B) of the first light guide plate 12, but it is not limited thereto. According to certain embodiments, the anti-reflective coating layer 18 can also be disposed on a surface of the substrate 11 that faces the first light guide plate 12. According to one other embodiment, as shown in FIG. 1, the anti-reflective coating layer 18 further has a plurality of extension regions 181 that are located near the first side portion 121 of the first light guide plate 12, and each of the plurality of extension regions 181 respectively corresponds to a region (i.e., each of the gap regions A1) between two adjacent ones of the light-emitting elements 13. In this way, a reflection of bright spots in the optical module 1A can be reduced. The anti-reflective coating layer 18 can be a black adhesive layer, but it is not limited thereto. In other embodiments, the anti-reflective coating layer 18 can be made of a dark colored material that is opaque or light-absorbing.

Figure 4:
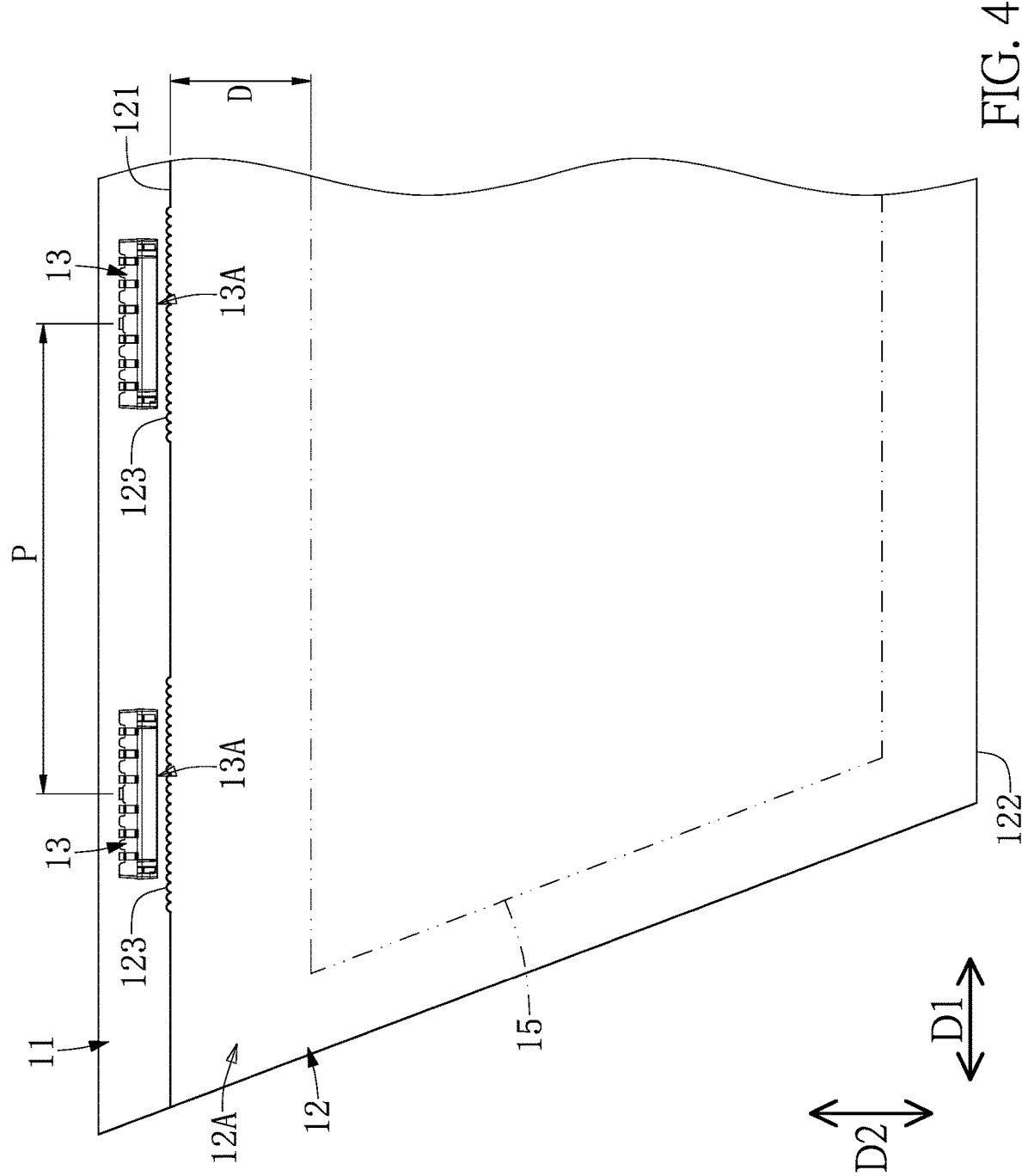
FIG. 4 is a schematic view illustrating a relation between a first light guide plate, a first pattern layer, and light-emitting elements according to one embodiment of the present disclosure.

Referring to FIG. 4, FIG. 4 is a schematic view illustrating a relation between the first light guide plate 12, the first pattern layer 15, and the at least one light-emitting element 13 according to one embodiment of the present disclosure. According to this embodiment, in a top view, the first light guide plate 12, the first pattern layer 15, and the at least one light-emitting element 13 of the optical module 1A have the following relation. In the second direction D2 that is orthogonal to the first direction D1, a perpendicular distance D between an edge of the first pattern layer 15 adjacent to the at least one first light-emitting element 13 and the first side portion 121, and a distance P between center axes of two adjacent ones of the first light-emitting elements 13 satisfy a relation of: D/P being between 0.3 and 0.7. Accordingly, the first pattern layer 15 is fully presented, and a light uniformity of the optical module 1A can be improved. In other words, the image created by the first pattern layer 15 is highly uniform and appealing in appearance.

Reference is further made to FIG. 1. In this embodiment, the first side portion 121 of the first light guide plate 12 has at least one optical microstructure 123 corresponding to the at least one first light-emitting element 13. For example, the first side portion 121 can be a surface having a jagged microstructure, or can be a rough surface having microstructures formed thereon. By the design of the optical microstructure 123, a light beam emitted by the first light-emitting element 13 is scattered through the optical microstructure 123, such that the light is output in a greater angle. Furthermore, the distance P (as shown in FIG. 4) between center axes of two adjacent ones of the first light-emitting elements 13 is increased, such that a quantity of the first light-emitting elements 13 can be decreased, so as to reduce a production cost of the optical module 1A. According to certain embodiments, the optical microstructures 123 formed on the first side portion 121 are spaced apart from each other and are formed in a non-continuous manner, and each of the optical microstructures 123 corresponds to each of the first light-emitting elements 13, respectively. However, the present disclosure is not limited to correspondingly forming the optical microstructures 123 on the first side portion 121 for each of the first light-emitting elements 13.

Reference is further made to FIG. 1. The optical module 1A further includes a light-blocking layer 19. The light-blocking layer 19 is disposed on and surrounds a peripheral region of at least one of the reflective layer 14 and the first light guide plate 12. The peripheral region refers to a region that is defined on a surface of at least one of the reflective layer 14 and the first light guide plate 12 and is located adjacent to outer sides of the optical module 1A. According to certain embodiments, the light-blocking layer 19 may be an opaque adhesive layer for bonding the first light guide plate 12 to the reflective layer 14. For example, the light-blocking layer 19 is implemented by a black double-sided tape. Because the light-blocking layer 19 is able to block light, the light-blocking layer 19 for adhesion can be prevented from receiving/absorbing light and radiating the light to the outside. Therefore, the optical module 1A does not emit light that is unrelated to a design pattern, so as to avoid affecting a light-emitting effect of the optical module 1A.

Figure 5:
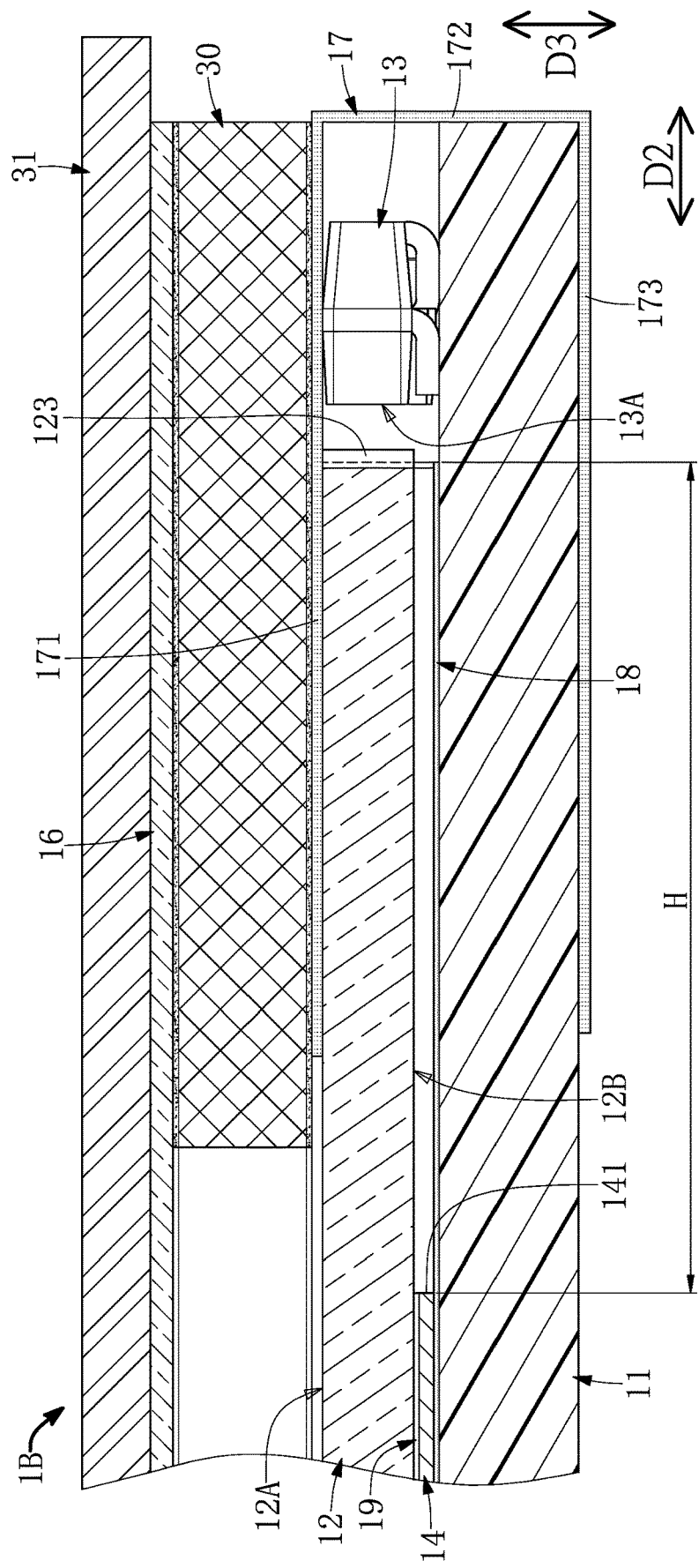
FIG. 5 is a side view of an optical module according to one embodiment of the present disclosure.

FIG. 5 is a side view of an optical module 1B according to one embodiment of the present disclosure. In this embodiment, the optical module 1B includes a cover plate 31 (i.e., a light-permeable cover plate). The cover plate 31 can be made of polymethyl methacrylate (PMMA), glass, or polycarbonate (PC). The cover plate 31 is light-permeable and is located on the beam splitting layer 16. The cover plate 31 and the beam splitting layer 16 are provided without an air gap therebetween, and can be tightly adhered to each other through the adhesion of light-permeable glue. However, the present disclosure is not limited thereto. According to certain embodiments, the beam splitting layer 16 can be plated on the cover plate 31 by a way of plating.

Figure 6:
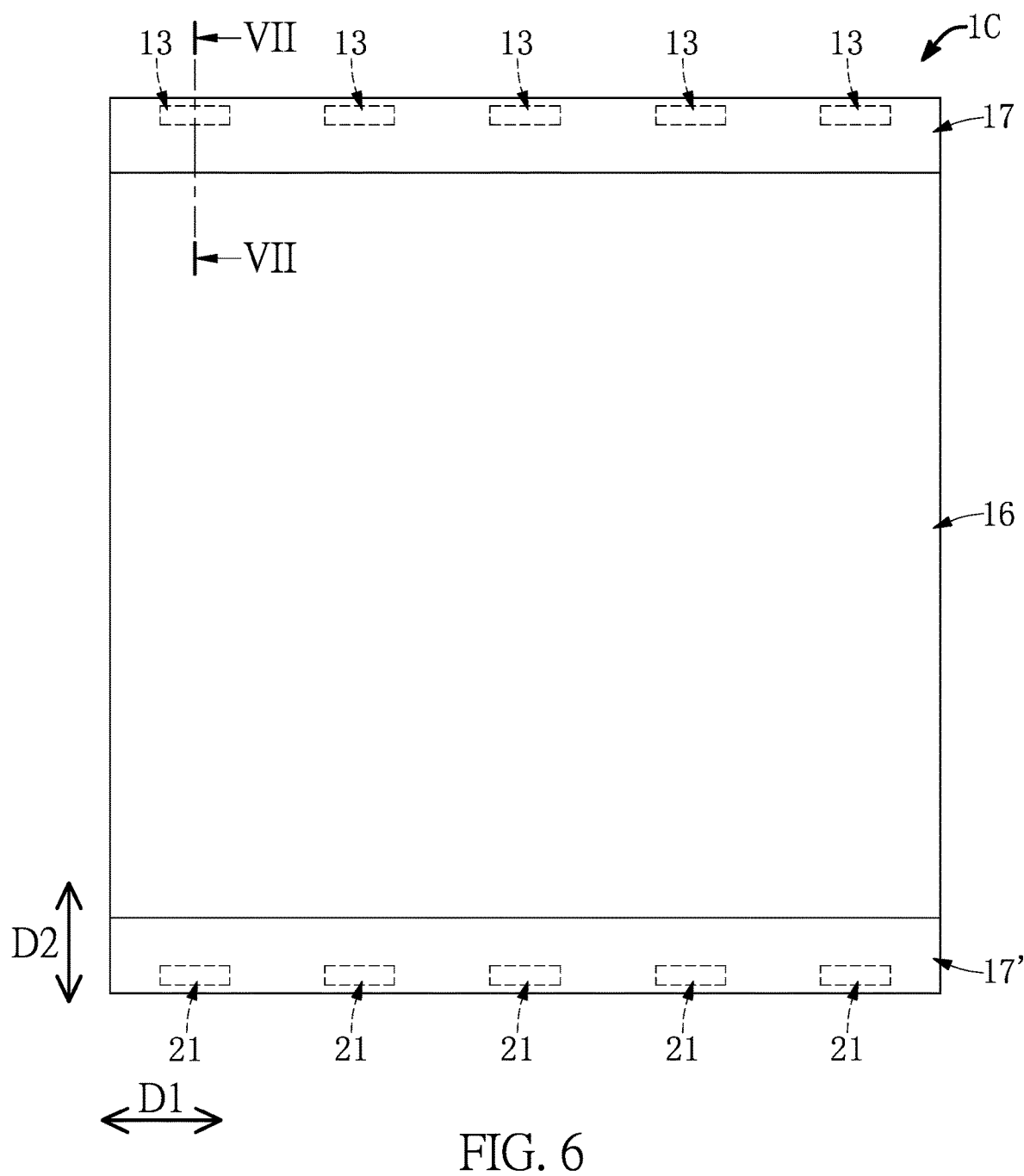
FIG. 6 is a top view of an optical module according to one embodiment of the present disclosure.
Figure 7:
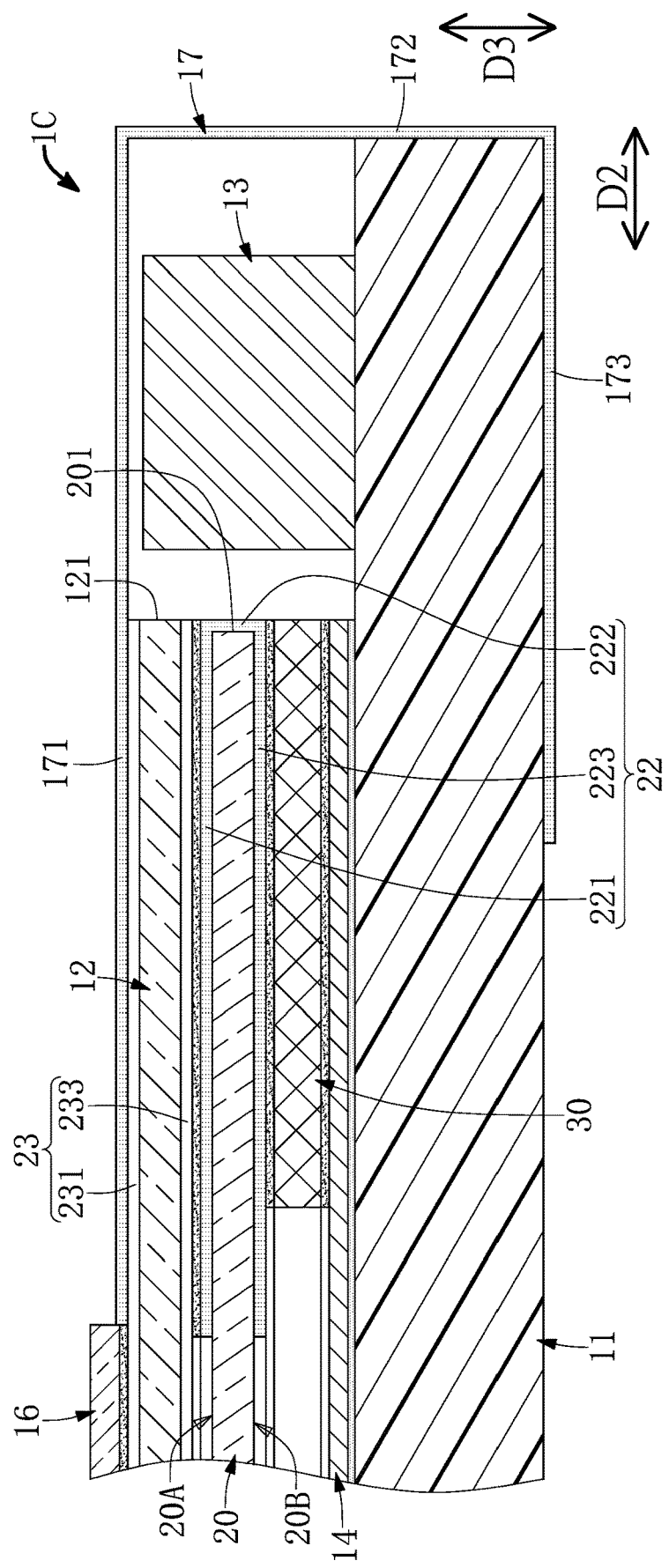
FIG. 7 is a side view of the embodiment of FIG. 6.
Figure 8:
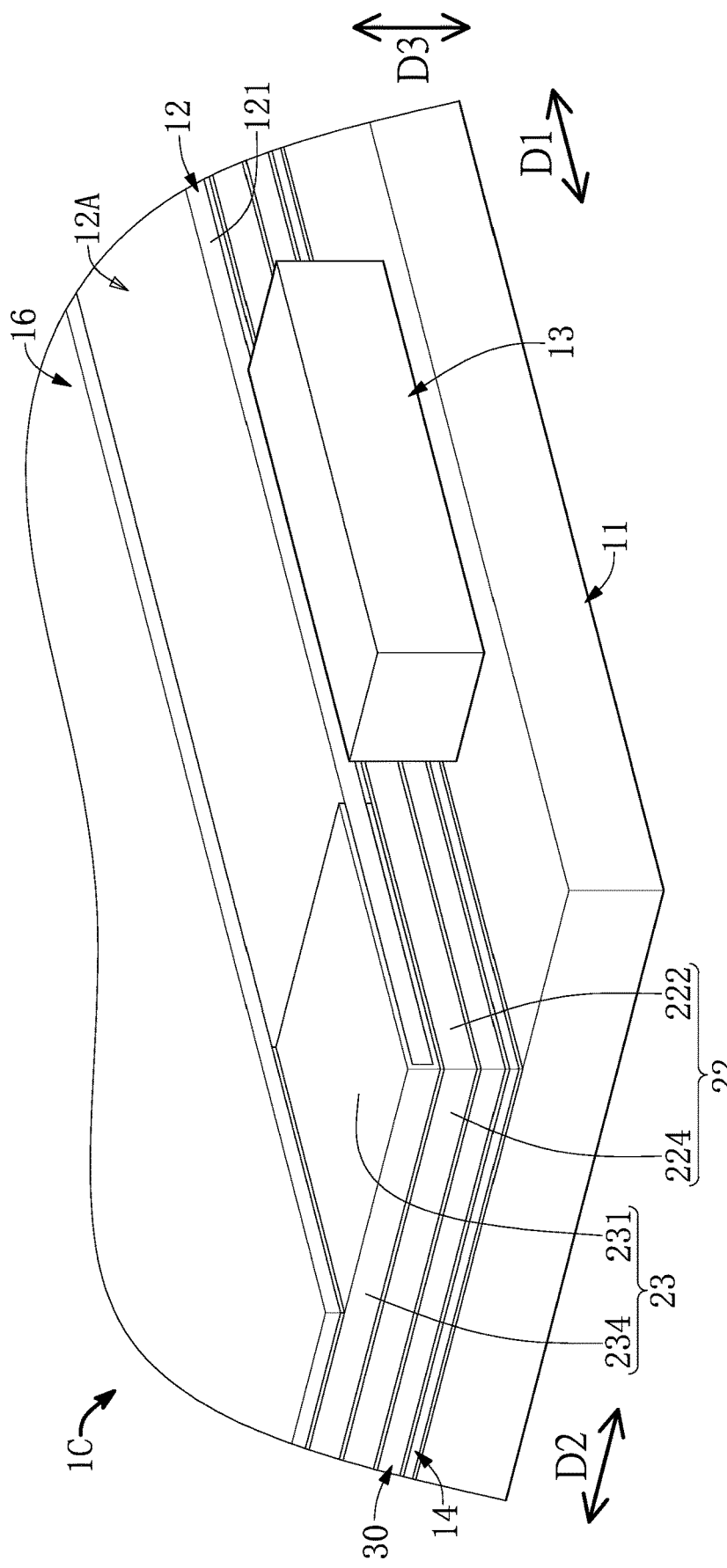
FIG. 8 is a schematic partial view of the embodiment of FIG. 6.
Figure 9:
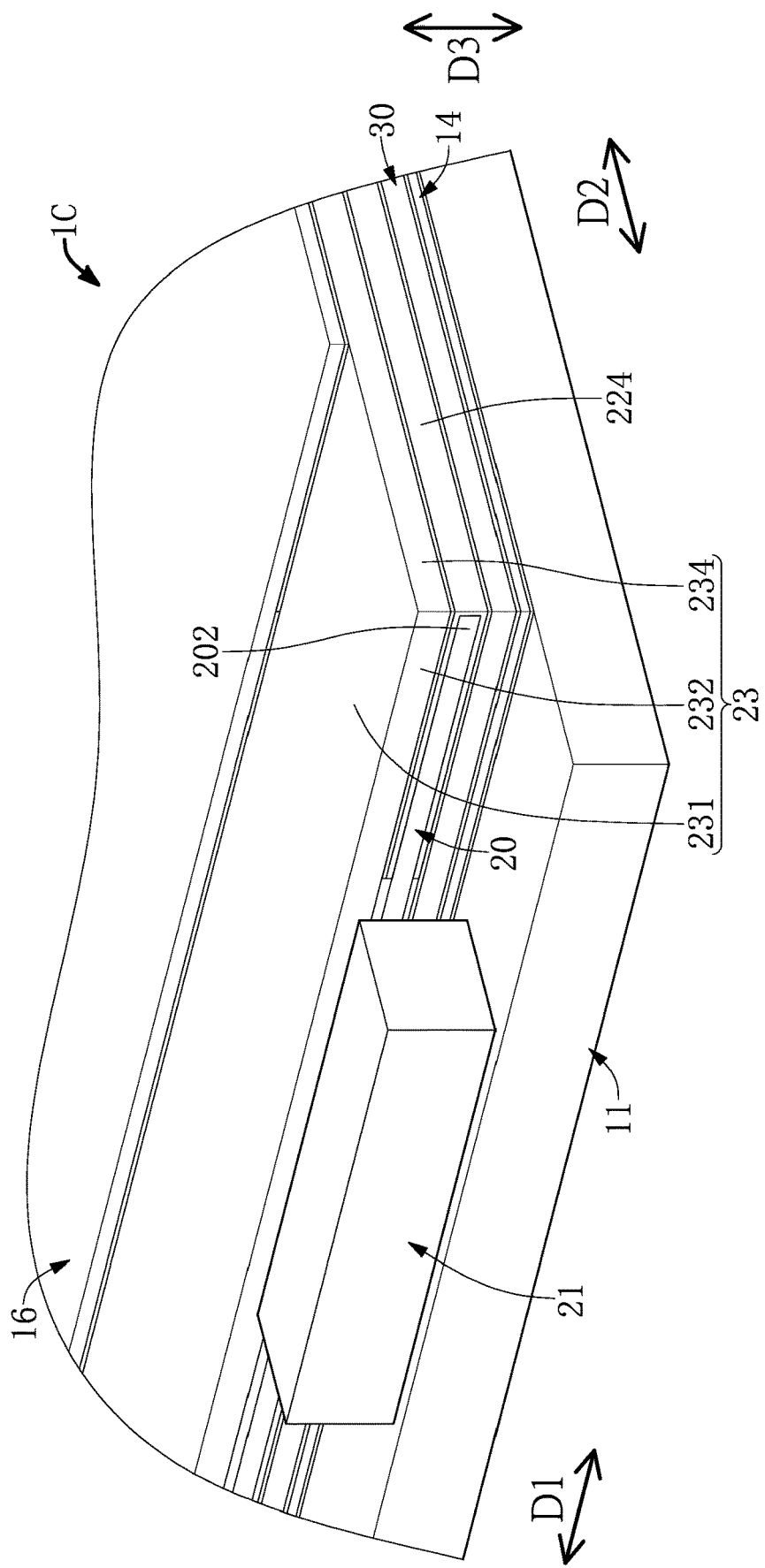
FIG. 9 is another schematic partial view of the embodiment of FIG. 6.

Referring to FIG. 6 to FIG. 9, FIG. 6 is a top view of an optical module 1C according to one embodiment of the present disclosure, FIG. 7 is a side view of the embodiment of FIG. 6, FIG. 8 is a schematic partial view of the embodiment of FIG. 6, and FIG. 9 is another schematic partial view of the embodiment of FIG. 6. In this embodiment, the optical module 1C includes a second light guide plate 20, at least one second light-emitting element 21, a second pattern layer (not shown in the figures), a second light-shielding structure 22, and a third light-shielding structure 23. The second light guide plate 20 is arranged between the first light guide plate 12 and the substrate 11. The second light guide plate 20 has a third surface 20A and a fourth surface 20B that is opposite to the third surface 20A, and the fourth surface 20B faces the substrate 11. Two lateral sides of the second light guide plate 20 extend along the first direction D1 are respectively defined as a third side portion 201 and a fourth side portion 202 (as shown in FIG. 9) that is opposite to the third side portion 201. The third side portion 201 is parallel with and is substantially flush with the first side portion 121, and the fourth side portion 202 is parallel with and is substantially flush with the second side portion 122. The at least one second light-emitting element 21 is disposed on the substrate 11. A light output surface of the at least one second light-emitting element 21 faces the fourth side portion 202 (as the light input side). In other words, the at least one first light-emitting element 13 and the at least one second light-emitting element 21 are respectively disposed on two opposite sides of the substrate 11, and the at least one second light-emitting element 21 are masked by another first light-shielding structure 17 (also referred as 17'). The second pattern layer (not shown in the figures) is formed on the second light guide plate 20. The second light-shielding structure 22 covers at least a part of the third surface 20A, the third side portion 201, and a part of the fourth surface 20B of the second light guide plate 20. The third light-shielding structure 23 covers at least a part of the first surface 12A, the second side portion 122, and a part of the second surface 12B of the first light guide plate 12. Details of the second light guide plate 20 may be referred to in the descriptions of the aforementioned first light guide plate 12, and details of the second light-emitting elements 21 may be referred to in the descriptions of the first light-emitting elements 13. However, quantities and wavelength ranges of the second light-emitting elements 21 and the first light-emitting elements 13 may be the same or different. Materials of the second light-shielding structure 22 and the third light-shielding structure 23 may refer to the descriptions of the aforementioned first light-shielding structure 17. Details of the second pattern layer may refer to the descriptions of the first pattern layer 15, and the second pattern layer may be formed on at least one of the third surface 20A and the fourth surface 20B of the second light guide plate 20. It should be noted that, patterns on the first and second pattern layers may be the same or different, and are not limited in the present disclosure. According to certain embodiments, the first pattern layer is a non-white pattern layer, for example, a gray pattern layer (produced by lowering a content of a white ink in a mixture of the white ink and a black ink) or a white pattern layer composed of a white ink, and the second pattern layer is a white pattern layer. For example, in an embodiment where the first pattern layer is a gray pattern layer and the second pattern layer is a white pattern layer, when the first light-emitting elements 13 and the second light-emitting elements 21 emit light at the same time, a negative impact of the second pattern layer on the light-emitting effect of the first pattern layer 15 is reduced. However, the present disclosure is not limited thereto. In one embodiment, the first pattern layer 15 and the second pattern layer do not overlap with each other, or only partially overlap with each other. Therefore, the first pattern layer 15 and the second pattern layer can both be a white pattern layer. In this way, when at least one of the first light-emitting elements 13 and the second light-emitting elements 21 emits light, various patterns can be presented. It should be noted that, by controlling the first light-emitting elements 13 and the second light-emitting elements 21 to simultaneously emit light or sequentially emit light, or controlling only one of the first light-emitting elements 13 and the second light-emitting elements 21 to emit light, patterns and corresponding colors that are presented can be changed, such that a visual effect provided to users can be enriched.

Moreover, in this embodiment, the second light-shielding structure 22 may be a frame structure that is substantially U-shaped. The second light-shielding structure 22 includes a second upper extension 221, a second lower extension 223, a second connection portion 222 connected to each of the second upper extension 221 and the second lower extension 223 (as shown in FIG. 8). More specifically, the second light-shielding structure 22 can be a U-shaped structure formed by the second upper extension 221, the second lower extension 223, and the second connection portion 222 (including the two opposing second lateral extensions 224) that continuously extend and surround the three lateral sides of the second light guide plate 20. For example, the second upper extension 221 is located on the third surface 20A and shields a part of the third surface 20A. The second connection portion 222 is located on the third side portion 201 and shields the third side portion 201. The second lower extension 223 is located on the fourth surface 20B and shields a part of the fourth surface 20B. The two second lateral extensions 224 are opposite to each other and are respectively located at two opposite lateral sides of the second light guide plate 20 to shield the two lateral sides, as shown in FIG. 8.

The third light-shielding structure 23 may also be a frame structure that is substantially U-shaped. The third light-shielding structure 23 includes a third upper extension 231, a third lower extension 233, a third connection portion 232 connected to each of the third upper extension 231 and the third lower extension 233 (as shown in FIG. 9). More specifically, the third light-shielding structure 23 can be a U-shaped structure formed by the third upper extension 231, the third lower extension 233, and the third connection portion 232 (including the two opposing third lateral extensions 234) that continuously extend and surround the three lateral sides of the first light guide plate 12. For example, the third upper extension 231 is located on the first surface 12A and shields a part of the first surface 12A. The third connection portion 232 is located on the second side portion 122 and shields the second side portion 122. The third lower extension 233 is located on the second surface 12B and shields a part of the second surface 12B. The two third lateral extensions 234 are opposite to each other and are respectively located at two opposite lateral sides of the first light guide plate 12 to shield the two lateral sides, as shown in FIG. 8 or FIG. 9.

Figure 10:
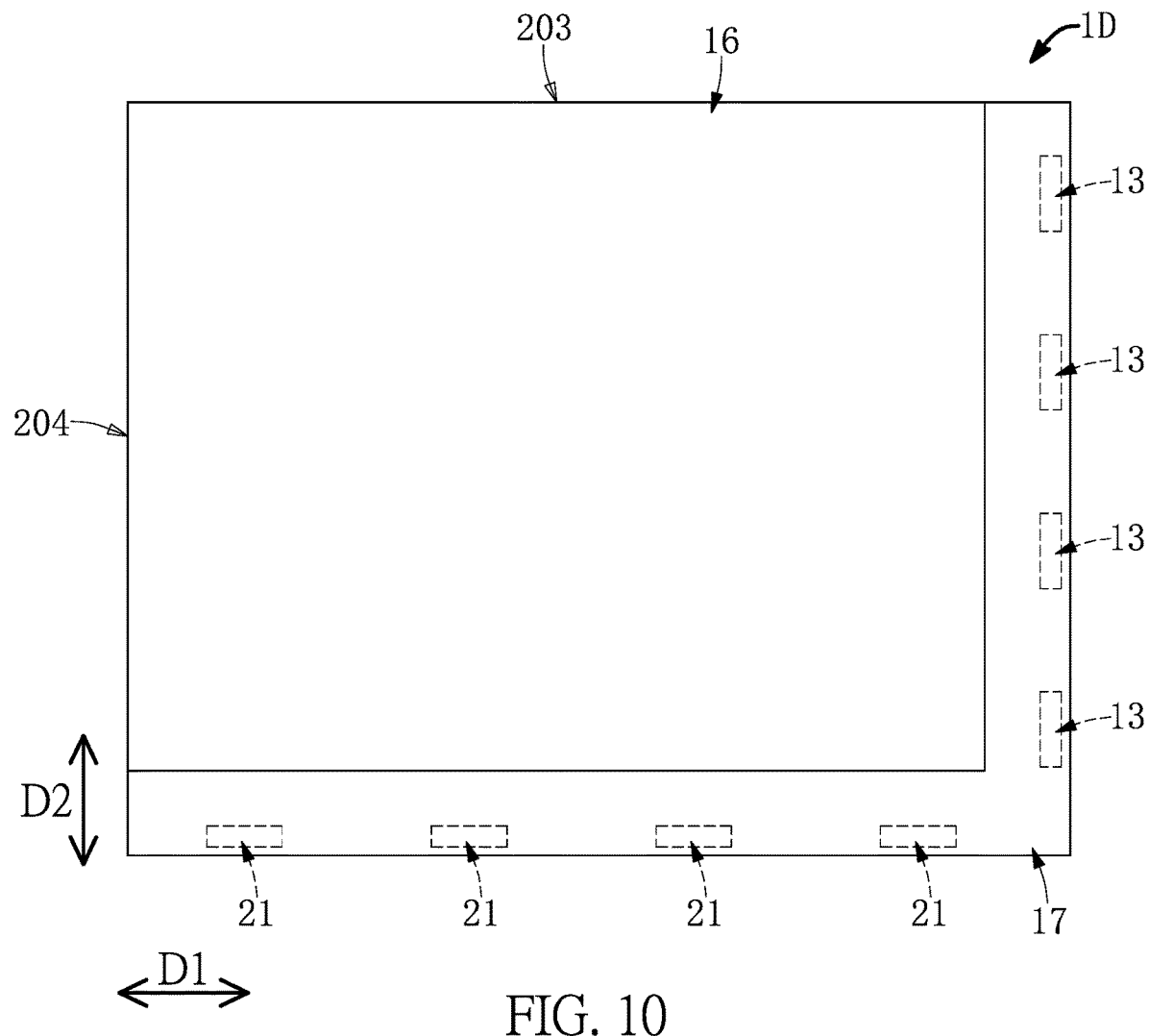
FIG. 10 is a top view of an optical module according to one embodiment of the present disclosure.
Figure 11:
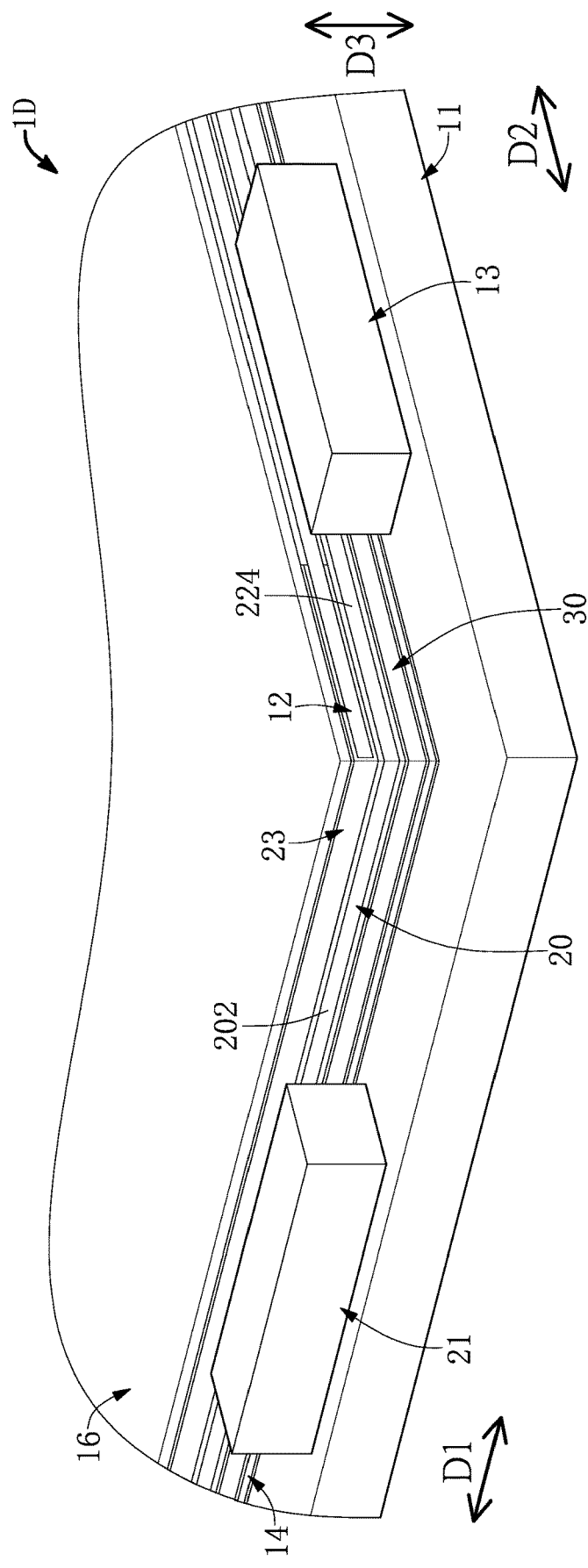
FIG. 11 is a schematic partial view of the embodiment of FIG. 10.

Referring to FIG. 10 and FIG. 11 in conjunction with FIG. 7 to FIG. 9, FIG. 10 is a top view of an optical module 1D according to one embodiment of the present disclosure, and FIG. 11 is a schematic partial view of the embodiment of FIG. 10. A difference between this embodiment and the previous embodiment is that, the fourth side portion 202 (as the light input side) is adjacent to the third side portion 201.

In other words, the first light-emitting elements 13 and the second light-emitting elements 21 are respectively arranged on two adjacent sides of the substrate 11 and are respectively arranged along two directions that are perpendicular to each other. The second light-shielding structure 22 covers at least a part of the third surface 20A, a fifth side portion 203 (as shown in FIG. 10) that is opposite to the fourth side portion 202, and a part of the fourth surface 20B.

Specifically, the second light-shielding structure 22 includes the second upper extension 221, the second connection portion 222, the second lower extension 223, and the two second lateral extensions 224 that are opposite to each other. The second upper extension 221 is located on the third surface 20A and shields a part of the third surface 20A. The second connection portion 222 is located on the fifth side portion 203 and shields the fifth side portion 203. The second lower extension 223 is located on the fourth surface 20B and shields a part of the fourth surface 20B. The two second lateral extensions 224 that are opposite to each other are respectively located at the third side portion 201 and a sixth side portion 204 (as shown in FIG. 10) that is opposite to the third side portion 201 to respectively shield the third side portion 201 and the sixth side portion 204, as shown in FIG. 11.

Reference is further made to FIG. 6 to FIG. 11. According to these embodiments, the beam splitting layer 16, the first light guide plate 12, and the second light guide plate 20 are stacked and laminated together, and the supporting member 30 (an elastic supporting member) of the optical modules 1C and 1D, for example, is a hollow frame made of sponge. The supporting member 30 supports the beam splitting layer 16, the first light guide plate 12, and the second light guide plate 20, such that the second light guide plate 20 and the reflective layer 14 are spaced apart from each other by a gap.

Figure 12:
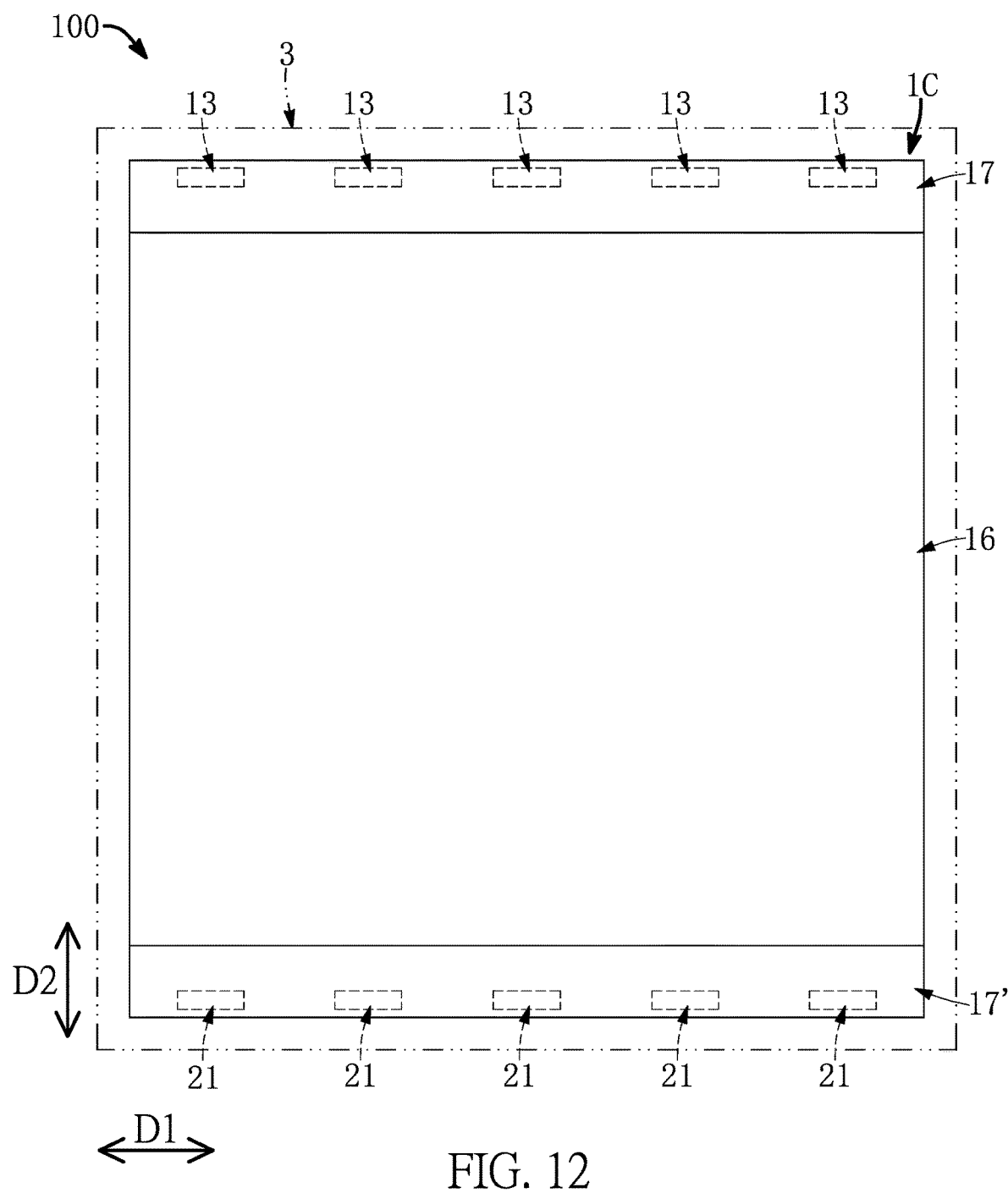
FIG. 12 is a top view of an electronic device according to one embodiment of the present disclosure.

Referring to FIG. 12, FIG. 12 is a schematic top view of an electronic device 100 according to one embodiment of the present disclosure. The electronic device 100 includes a housing 3 and the optical module 1C, but it is not limited thereto. In other embodiments, the electronic device 100 may include the optical module 1D. In this embodiment, the optical module 1C is located in the housing 3, and the housing 3 may be a frame or a casing body, but the present disclosure is not limited thereto. In practice, the electronic device 100 can be applied to art installations, advertising signboards, indicator signs, and electronic products (such as laptop computers or computer cases) such that a pattern displayed by the optical module 1C is applied to a wide range of the products mentioned above. As shown in FIG. 12, the electronic device 100 is, for example, a laptop computer.

It should be noted that, in the optical module of the present disclosure, by the design of the first light guide plate 12 having a first pattern layer (and/or the second light guide plate 20 having a second pattern layer), a quantity of the first light-emitting elements 13 (and/or the second light-emitting elements 21) is less than that of the existing technology. Therefore, in addition to having a good infinite reflection mirror visual effect, the present disclosure can also reduce manufacturing costs and save energy.

Beneficial Effects of the Embodiments

In conclusion, in the optical module provided by the present disclosure, by virtue of "a predetermined gap being defined between a side edge of the reflective layer adjacent to the light output surface and the first side portion of the first light guide plate," a pattern can be completely illuminated and the brightness can be consistent, such that the pattern is highly uniform and appealing in appearance.

Furthermore, in the optical module provided by the present disclosure, by virtue of "the first light-shielding structure covering a part of the substrate and a part of the first surface of the first light guide plate that is configured to hide the at least one first light-emitting element" "a side edge of the reflective layer adjacent to the light output surface being substantially parallel to the first side portion, and a predetermined gap being defined between the side edge of the reflective layer and the first side portion," "an orthogonal projection of the reflective layer on the first light guide plate covering an orthogonal projection of the first pattern layer on the first light guide plate," and "the optical module further including an anti-reflective coating layer formed on the first light guide or the substrate, and an area of an orthogonal projection of the anti-reflective coating layer on the substrate overlapping with an area defined between the reflective layer and the first side portion of the first light guide plate," when the material of the reflective layer reflects the light emitted by the at least one first light-emitting element, an issue of a bright spot of the first light-emitting element being enhanced and causing uneven brightness can be prevented, thereby achieving the technical effects of the first pattern layer being completely illuminated and the first pattern layer having a consistent brightness. In addition, when the aforementioned predetermined gap ranges from 4 mm to 6 mm, the aforementioned technical effect can be further improved.

Moreover, in the optical module provided by the present disclosure, by virtue of "a perpendicular distance D between an edge of the first pattern layer adjacent to the at least one first light-emitting element and the first side portion, and a distance P between center axes of two adjacent ones of the first light-emitting elements satisfying a relation of: D/P being between 0.3 and 0.7," the first pattern layer can be fully presented, and a light consistency of the optical module can be improved.

In addition, in the optical module provided by the present disclosure, by virtue of "the first side portion of the first light guide plate having at least one optical microstructure corresponding to the at least one first light-emitting element," by providing the optical microstructure, a light output angle of the first light-emitting element can be increased, such that the distance P between the center axes of two adjacent ones of the first light-emitting elements can also be increased. Therefore, an amount of the first light-emitting elements can be reduced, thereby decreasing a manufacturing cost of the optical module.

In addition, in the optical module provided by the present disclosure, by virtue of "the optical module further including a light-blocking layer located between the first light guide plate and the reflective layer, and the light-blocking layer being disposed on and surrounding a peripheral region of at least one of the reflective layer and the first light guide plate," and "the light-blocking layer adopting a black double-sided tape," the adhesive layer can be prevented from receiving/absorbing light and radiating the light to the outside that negatively affects a desired light-emitting effect of the optical module.

According to certain embodiments of the present disclosure, the optical module includes a first pattern module and a second pattern module. By the design of the first light-shielding structure, the second light-shielding structure, and the third light-shielding structure, and the technical solution of "the first light-emitting element and the second light-emitting element simultaneously emitting light, or only one of the first light-emitting element and the second light-emitting element emitting light at one time," a visual effect having a rich pattern can be provided to users.

The present disclosure further provides an electronic device that includes the aforementioned optical module, and the technical effects of the aforementioned optical module can be achieved during practical usage of the electronic device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical module, comprising:
a substrate;
a first light guide plate disposed above the substrate, wherein the first light guide plate has a first surface and a second surface that is opposite to the first surface, and the second surface faces the substrate; wherein two lateral sides of the first light guide plate that extend oppositely along a first direction are defined as a first side portion and a second side portion that is opposite to the first side portion;
at least one first light-emitting element disposed on the substrate, wherein a light output surface of the at least one first light-emitting element faces the first side portion;
a reflective layer arranged between the substrate and the first light guide plate;
a first pattern layer formed on the first light guide plate; and
a beam splitting layer disposed above the first light guide plate and disposed away from the substrate;
wherein a predetermined gap is defined between a side edge of the reflective layer adjacent to the light output surface and the first side portion.

2. The optical module according to claim 1, wherein the predetermined gap ranges from 4 mm to 6 mm.

3. The optical module according to claim 1, wherein the beam splitting layer is a film layer that allows a portion of light to pass through and reflects another portion of light.

4. The optical module according to claim 1, further comprising:
a supporting member located between the beam splitting layer and the first light guide plate; and
a light-permeable cover plate disposed on the beam splitting layer.

5. The optical module according to claim 4, wherein the light-permeable cover plate and the beam splitting layer are provided without an air gap therebetween.

6. An optical module, comprising:
a substrate;
a first light guide plate disposed above the substrate, wherein the first light guide plate has a first surface and a second surface that is opposite to the first surface, and the second surface faces the substrate; wherein two lateral sides of the first light guide plate extending along a first direction are respectively defined as a first side portion and a second side portion that is opposite to the first side portion;
at least one first light-emitting element disposed on the substrate, wherein the at least one first light-emitting element has a light output surface facing the first side portion;
a reflective layer arranged between the substrate and the first light guide plate;
a first pattern layer formed on the first light guide plate;
a first light-shielding structure covering a part of the substrate and a part of the first surface of the first light guide plate that is configured to hide the at least one first light-emitting element; and
a beam splitting layer disposed above the first light guide plate and the first light-shielding structure, and disposed away from the substrate.

7. The optical module according to claim 6, wherein the at least one first light-emitting element is plural in quantity, the plurality of first light-emitting elements are arranged to be spaced apart from each other along the first direction that is parallel to the first side portion, and two adjacent ones of the plurality of first light-emitting elements have one of a plurality of gap regions formed therebetween.

8. The optical module according to claim 7, wherein a side edge of the reflective layer adjacent to the light output surface is substantially parallel to the first side portion; wherein a predetermined gap is defined between the side edge of the reflective layer and the first side portion, and the predetermined gap ranges from 4 mm to 6 mm.

9. The optical module according to claim 8, wherein the first light-shielding structure includes a first upper extension, a first lower extension, and a first connection portion connected to each of the first upper and lower extensions, the first lower extension is located below the bottom surface of the substrate, the first connection portion is located beside a lateral side of the substrate and the at least one first light-emitting element, and the first upper extension covers a part of the first surface of the first light guide plate.

10. The optical module according to claim 9, wherein areas of orthogonal projections of the first upper extension and the first lower extension on the substrate do not overlap with an area of an orthogonal projection of the reflective layer on the substrate.

11. The optical module according to claim 8, further comprising an anti-reflective coating layer formed on the first light guide or the substrate, wherein the anti-reflective coating layer is disposed between the first light guide and the substrate, and an area of an orthogonal projection of the anti-reflective coating layer on the substrate overlaps with an area defined between the reflective layer and the first side portion of the first light guide plate.

12. The optical module according to claim 11, wherein the anti-reflective coating layer has a plurality of extension regions, and the plurality of extension regions respectively correspond to the plurality of gap regions.

13. The optical module according to claim 8, wherein, in a second direction orthogonal to the first direction, a perpendicular distance D between an edge of the first pattern layer adjacent to the at least one first light-emitting element and the first side portion, and a distance P between center axes of two adjacent ones of the first light-emitting elements satisfy a relation of: D/P being between 0.3 and 0.7.

14. The optical module according to claim 6, wherein an area of an orthogonal projection of the reflective layer on the substrate covers an area of an orthogonal projection of the first pattern layer on the substrate.

15. The optical module according to claim 6, wherein the first pattern layer is a white pattern layer composed of white ink.

16. The optical module according to claim 6, wherein the first side portion of the first light guide plate has at least one optical microstructure corresponding to the at least one first light-emitting element.

17. The optical module according to claim 6, wherein the first pattern layer is disposed on at least one of the first surface and the second surface of the first light guide plate.

18. The optical module according to claim 1, further comprising a light-blocking layer for bonding the first light guide plate to the reflective layer, wherein the light-blocking layer is disposed on and surrounds a peripheral region of at least one of the reflective layer and the first light guide plate.

19. The optical module according to claim 6, further comprising a light-blocking layer for bonding the first light guide plate to the reflective layer, wherein the light-blocking layer is disposed on and surrounds a peripheral region of at least one of the reflective layer and the first light guide plate.

20. The optical module according to claim 1, further comprising:
a second light guide plate arranged between the first light guide plate and the substrate, wherein the second light guide plate has a third surface and a fourth surface that is opposite to the third surface, and the fourth surface faces the substrate; wherein two lateral sides of the second light guide plate extending along the first direction are respectively defined as a third side portion and a fourth side portion that is opposite to the third side portion; wherein the third side portion is substantially flush with the first side portion, and the fourth side portion is substantially flush with the second side portion;
at least one second light-emitting element disposed on the substrate, wherein a light output surface of the at least one second light-emitting element faces the fourth side portion;
a second pattern layer formed on the second light guide plate;
a second light-shielding structure covering at least a part of the third surface, the third side portion, and a part of the fourth surface of the second light guide plate; and
a third light-shielding structure covering at least a part of the first surface, the second side portion, and a part of the second surface of the first light guide plate.

21. The optical module as recited in claim 1, further comprising:
a second light guide plate arranged between the first light guide plate and the substrate, wherein the second light guide plate has a third surface and a fourth surface that is opposite to the third surface, and the fourth surface faces the substrate; wherein two lateral sides of the second light guide plate extending along the first direction and a second direction are respectively defined as a third side portion and a fourth side portion that is adjacent to the third side portion; wherein the third side portion is substantially flush with the first side portion;
at least one second light-emitting element disposed on the substrate, wherein a light output surface of the at least one second light-emitting element faces the fourth side portion;
a second pattern layer formed on the second light guide plate;
a second light-shielding structure covering at least a part of the third surface, a fifth side portion that is opposite to the fourth side portion, and a part of the fourth surface of the second light guide plate; and
a third light-shielding structure covering at least a part of the first surface, the second side portion, and a part of the second surface of the first light guide plate.

22. The optical module according to claim 20, wherein the first pattern layer is a gray pattern layer or a white pattern layer, and the second pattern layer is a white pattern layer.

23. The optical module according to claim 21, wherein the first pattern layer is a gray pattern layer or a white pattern layer, and the second pattern layer is a white pattern layer.

24. The optical module according to claim 20, wherein the at least one second light-emitting element is plural in quantity, the plurality of second light-emitting elements are arranged to be spaced apart from each other along a direction that is parallel to the fourth side portion, and the plurality of second light-emitting elements and the at least one first light-emitting element have a same wavelength range or different wavelength ranges.

25. The optical module according to claim 21, wherein the at least one second light-emitting element is plural in quantity, the plurality of second light-emitting elements are arranged to be spaced apart from each other along a direction that is parallel to the fourth side portion, and the plurality of second light-emitting elements and the at least one first light-emitting element have a same wavelength range or different wavelength ranges.

26. An electronic device, comprising:
a housing; and
an optical module as claimed in claim 1 disposed in the housing.

27. An electronic device, comprising:
a housing; and
an optical module as claimed in claim 6 disposed in the housing.

* * * * *